(12) United States Patent
Burtness

(10) Patent No.: US 7,077,654 B2
(45) Date of Patent: Jul. 18, 2006

(54) VISUAL MATH TEACHING METHOD

(75) Inventor: JoAnn L. Burtness, 117 Lakeshore Rd., Guyton, GA (US) 31312

(73) Assignee: JoAnn L. Burtness, Louisburg, NC (US)

( * ) Notice: Subject to any disclaimer, the term of this patent is extended or adjusted under 35 U.S.C. 154(b) by 306 days.

(21) Appl. No.: 10/638,646

(22) Filed: Aug. 12, 2003

(65) Prior Publication Data

US 2004/0072132 A1    Apr. 15, 2004

Related U.S. Application Data

(60) Provisional application No. 60/417,181, filed on Oct. 10, 2002.

(51) Int. Cl.
*G09B 19/02*    (2006.01)

(52) U.S. Cl. ..................... 434/191; 434/188

(58) Field of Classification Search ............... 434/188, 434/191, 193, 195, 197, 198, 199, 207
See application file for complete search history.

(56) References Cited

U.S. PATENT DOCUMENTS

| | | | |
|---|---|---|---|
| 1,230,263 A | 6/1917 | Alexander | |
| D70,520 S | 7/1926 | Wehner | |
| 1,696,987 A * | 1/1929 | Troidl | 434/95 |
| 1,864,703 A | 6/1932 | West | |
| D96,323 S | 7/1935 | Lister | |
| 2,265,699 A | 12/1941 | Osborne | |
| 2,286,368 A | 6/1942 | May | |
| 3,365,198 A | 1/1968 | Hay | |
| 3,934,357 A | 1/1976 | Couvillion | |
| D252,211 S | 6/1979 | Garabed | |
| 4,430,825 A * | 2/1984 | Leboeuf | 446/101 |
| D292,103 S | 9/1987 | Boliek | |
| 4,778,392 A * | 10/1988 | Mitchell | 434/403 |
| 5,165,894 A * | 11/1992 | Reasoner et al. | 434/345 |
| D344,543 S | 2/1994 | Lemon | |
| 5,409,381 A * | 4/1995 | Sundberg et al. | 434/159 |
| D394,278 S | 5/1998 | Nowicki | |
| 6,447,300 B1 * | 9/2002 | Greenberg | 434/188 |

* cited by examiner

*Primary Examiner*—Kurt Fernstrom

(57) ABSTRACT

A visual method of teaching arithmetic, in which graphical representations of familiar objects are used instead of numbers, is particularly well suited for children who are visually oriented and have difficulty with numbers. The shapes of the objects resemble the numerals zero through nine. The objects may appear in any visual medium. Students are first shown examples of multiplication, division, addition, and subtraction, in which objects replace numbers. Each object is then shown by itself. The numeral that corresponds to the number value of each object is then overlaid on top of each object. Students are also shown groups of colored dots or balls, in which the colors of the dots match the colors of the objects and the number of dots corresponds to the numerical value represented by its corresponding object.

8 Claims, 14 Drawing Sheets

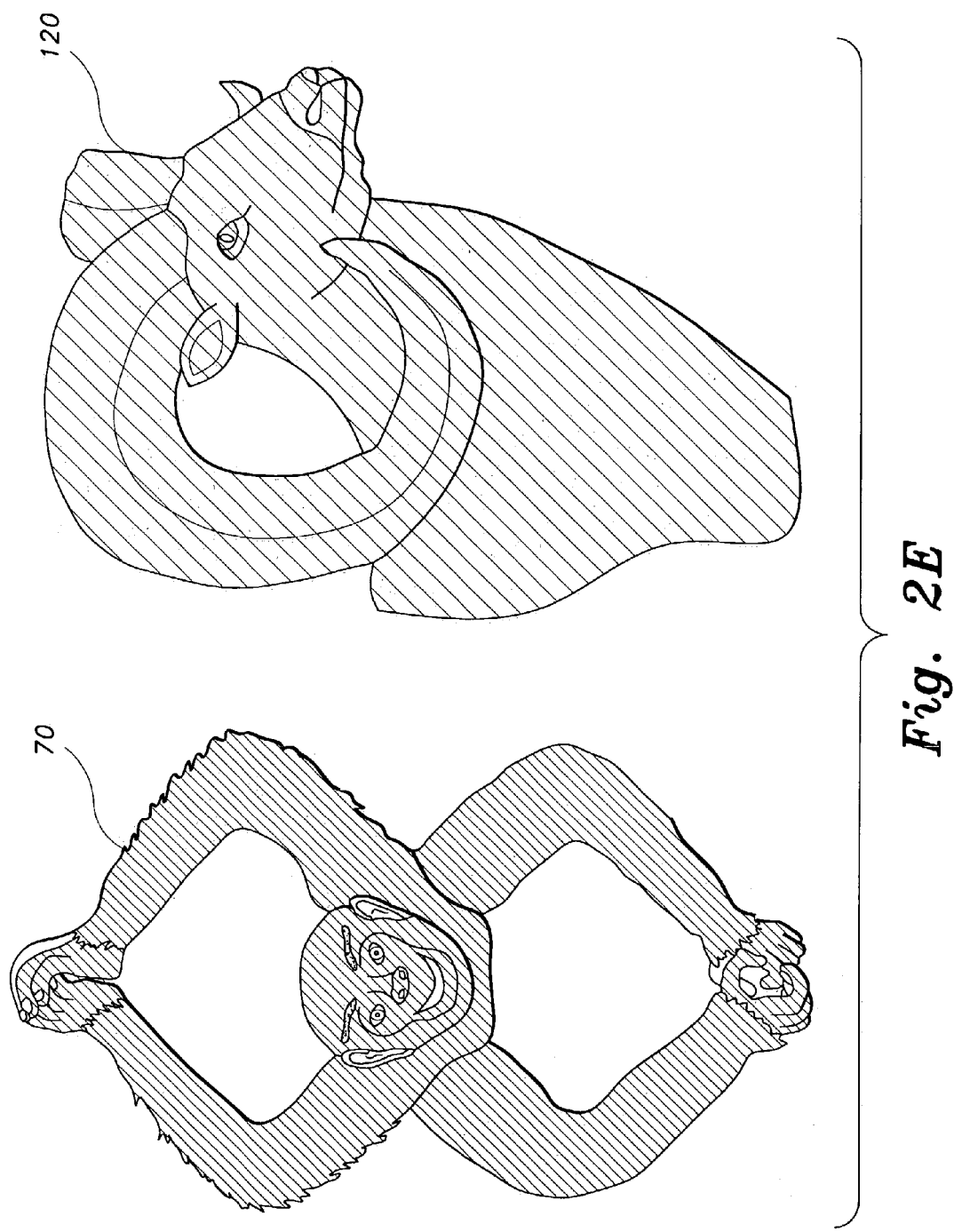

VISUAL MATH TEACHING METHOD

CROSS-REFERENCE TO RELATED APPLICATION

This application claims the benefit of U.S. Provisional Patent Application Ser. No. 60/417,181, filed Oct. 10, 2002.

BACKGROUND OF THE INVENTION

1. Field of the Invention

The present invention relates to teaching methods in general, and, in particular, to a visual method of teaching elementary arithmetic, in which graphical representations of familiar objects, such as animals and plants, are substituted for numbers. The present invention is particularly well suited for children who are visually oriented, and therefore have difficulty with numbers.

2. Description of Related Art

Experienced elementary school teachers know that some children, although bright, have difficulty learning arithmetic. Often, these children are much more visually oriented, and therefore have trouble with numbers, which require abstract thinking. These children have more success with teaching methods that employ pictures, graphics, and other visuals to convey concepts. In order to reach these children, there is a need for a method of teaching arithmetic that conveys mathematical ideas primarily through visual illustrations, rather than Arabic numerals.

Many graphical devices have been employed to teach math, for example, flash cards and posters, but all existing methods of which the inventor is aware are not helpful to visually oriented children because they remain, simply, pictures of numbers. The numbers may be large, may be in color, or may be animated, but they are still numbers, and therefore no more helpful to these children than numbers that are written on paper or on a blackboard.

It would be desirable to introduce visually oriented children to arithmetic first by substituting graphical illustrations of simple arithmetic calculations in place of numbers. It would be desirable for the graphical illustrations to be of familiar objects that the children recognize immediately. As one example, even very young children recognize animals and plants, therefore it would be desirable to use illustrations of animals and plants instead of numbers, although other common objects could be used. To aid the children in associating the illustrations with numbers, it would be desirable for the shapes of the common objects, in this example animals and plants, to resemble the numerals zero through nine. The instant invention is intended to be an introduction to arithmetic, therefore the instant invention is directed to children who have already learned to count.

To maintain flexibility in teaching approach, it would also be desirable for the graphical illustrations of common objects that represent numbers to appear in any medium, including print, video, electronic display media, optical, and any medium used for sculpture.

A discussion of the related art of which the present inventor is aware, and its differences and distinctions from the present invention, is provided below.

U.S. Design Pat. No. 70,520, granted Jul. 6, 1926 to Carl J. Wehner, shows an ornamental design for a font of type in which the letters of the English alphabet and the numerals 0 through 9 are represented by various animals configured in the shapes of the letters and numerals. U.S. Design Pat. No. 96,323, issued Jul. 23, 1935 to Lister, et al., shows an ornamental design for a font of type in which the letters of the English alphabet and the numerals 0 through 9 are represented by fish configured in the shapes of the letters and numerals. U.S. Design Patent No. 252,211, issued Jun. 26, 1979 to Khagak K. Garabed, shows an ornamental design for a calligraphic font in which the letters of the English alphabet and the numerals 0 through 9 are represented by birds configured in the shapes of the letters and numerals.

U.S. Design Pat. Nos. 292,103, issued Sep. 29, 1987 to L. E. Bolick, and 394,278, issued May 12, 1998 to S. A. Nowicki, show an ornamental design for a font of type using animals in the shape of alphabetic, characters, but no numerals are shown. U.S. Design Pat. No. 344,543, issued Feb. 22, 1994 to S. G. Lemon, shows an ornamental design for a set of numeral figures. None of the foregoing Design Patents describes a method of teaching arithmetic, nor do any of these patents teach the association of particular colors with particular numerals.

U.S. Pat. No. 1,230,263, issued Jun. 19, 1917 to W. H. S. Alexander, teaches cut-but alphabet toys for teaching the alphabet, including some toys having representations of animals thereon, but no numerals or method for teaching arithmetic is shown. U.S. Pat. No. 1,864,703, issued Jun. 28, 1932 to R. West, discloses educational blocks in the shape of letters having a subject, usually an animal, thereon for teaching the alphabet. U.S. Pat. No. 2,265,699 issued Dec. 9, 1941 to J. W. Osborne, discloses a means for teaching arithmetic using verses where numbers are to be inserted, and providing toys having a body in the shape of an Arabic numeral, with detachable head and garment bearing portions for attachment above and below the numerals, respectively. The child is expected to place the appropriate toy number in the proper space in the verse.

U.S. Pat. No. 2,286,368, issued Jun. 16, 1942 to C. W. May, describes a game of jacks having jackstones in the shape of letters and numbers in which the letter or number is displayed and supported at an angle on the surface on which the jackstone is thrown. U.S. Pat. No. 3,365,198, issued Jan. 23, 1968 to E. A. Hay, teaches alphabetical puzzle games having elements shaped like letters to which attachments may be added to complete the body shape of an animated or inanimate object, such as an animal. U.S. Pat. No. 3,934,357, issued Jan. 27, 1976 to C. C. Couvillion, discloses a teaching method and apparatus which uses representations of Arabic numerals from one to nine of progressively increasing size, in which two digits laid end-to-end have a total length corresponding to the length of the digit representing their sum.

None of the above inventions and patents, taken either singly or in combination, is seen to describe the instant invention as claimed.

SUMMARY OF THE INVENTION

The present invention is a visual method of teaching arithmetic wherein students are introduced to calculations through pictures rather than numerals. The pictures are depictions of familiar objects, for example, animals and plants, and are drawn so that their shapes resemble the numerals zero through nine.

Instruction begins by showing children many combinations of simple mathematical calculations, such as multiplication and addition, in which the illustrations are substituted for numerals. After the children are comfortable with these visual aids, they are shown each illustration by itself. The teacher then overlays the numeral that corresponds to a particular animal or plant on top of the illustration, thereby associating the illustration with a numeral. The teacher then presents the simple calculations to students again, but this time, the numerals are overlaid on top of the objects in the equations.

As further reinforcement, each illustration of a common object is matched with a picture of colored dots. The number of dots corresponds to the numerical value represented by the object. In addition, the colors of the dots match the colors of the objects.

The graphical illustrations, of common objects that represent numbers may appear in any medium, including print, videotape, electronic display, computer graphics, optical, and any medium used for sculpture.

Accordingly, it is a principal object of the invention to provide a method of teaching arithmetic in which illustrations of objects are substituted for numbers.

It is another object of the invention that the shapes of the objects resemble the numerals/zero through nine.

It is a further object of the invention to teach children arithmetic by first presenting them with calculations in which illustrations of objects are substituted for numbers.

Yet another object of the invention is to reinforce the association of the objects with numbers by presenting students with depictions of colored dots, in which the colors of the objects match the colors of the dots and the number of dots matches the numerical value of the object.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2E is a schematic view of a math teaching aid according to the present invention depicting a monkey, which represents the numeral 8, and a bighorn sheep, which represents the numeral 9.

Similar reference characters denote corresponding features consistently throughout the attached drawings.

DETAILED DESCRIPTION OF THE PREFERRED EMBODIMENT

The present invention is a visual method of teaching arithmetic to students who have difficulty with numbers by introducing them to elementary mathematical concepts through pictures rather than numbers. The instant invention is intended to be an introduction to arithmetic, therefore the instant invention is directed to children who have already learned to The present method begins by introducing children to simple arithmetic calculations in which pictures of familiar objects, for example, animals and plants, are substituted for numbers. Each object is a different color. The reason for the coloration will become apparent in a later step in the instant method. It will be understood that the term "pictures", as used herein, refers to a visual image of the objects produced in any medium, including print, videotape, electronic display, computer graphics, optical, and any medium used for sculpture, or any other medium for producing visual images, either two-dimensional or three-dimensional.

In this first step of the method, no reference is made to numbers. The goal is to introduce children to such arithmetical operations as multiplication, division, addition, and subtraction without using numbers. Numbers are introduced in a later step in the method, which will be explained below.

Figure 1A:
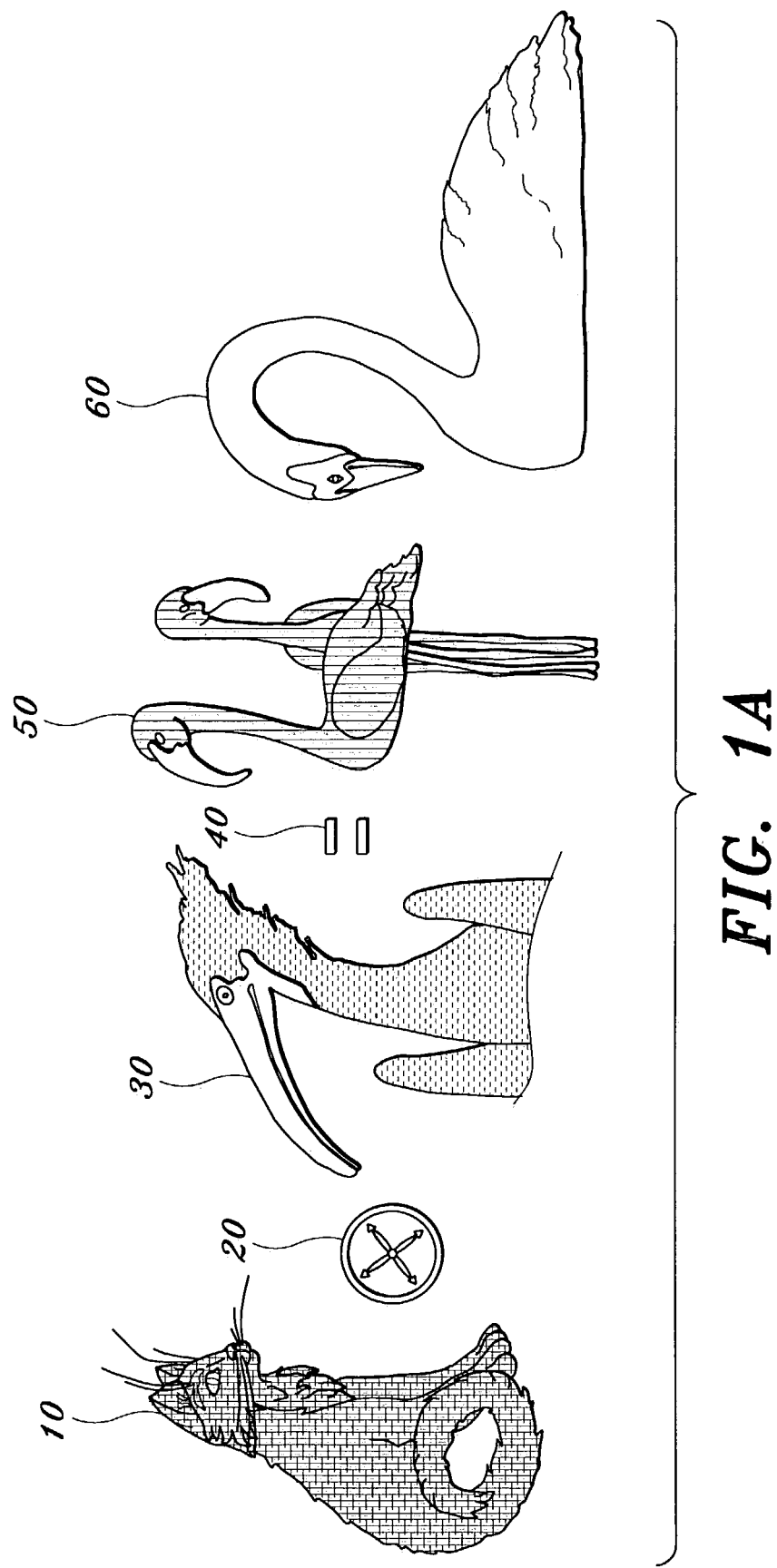
FIG. 1A is a schematic view of a math teaching aid according to the present invention in which an arithmetic calculation or equation is represented visually by pictures in place of numerals.

FIG. 1A is representative of the first step in the method. FIG. 1A shows a simple arithmetic calculation, in which pictures of familiar objects have been substituted for numbers. A picture of a yellow cat 10, which represents the numeral six, is followed by a graphical depiction of the "×" symbol for multiplication 20. The "×" symbol is followed by a picture of a blue heron 30, which represents the numeral seven. The heron is followed by a graphical depiction of the "=" symbol for equals 40. The "=" symbol is followed by a picture of two pink flamingos 50, which represent the numeral four. The flamingos are followed by a picture of a white swan 60, which represents the numeral two. Together, the flamingoes 50 and the swan 60 represent the number forty-two, which is the result of multiplying six times seven. In this step, only the illustrations are shown before reference is made to numbers.

Figure 1B:
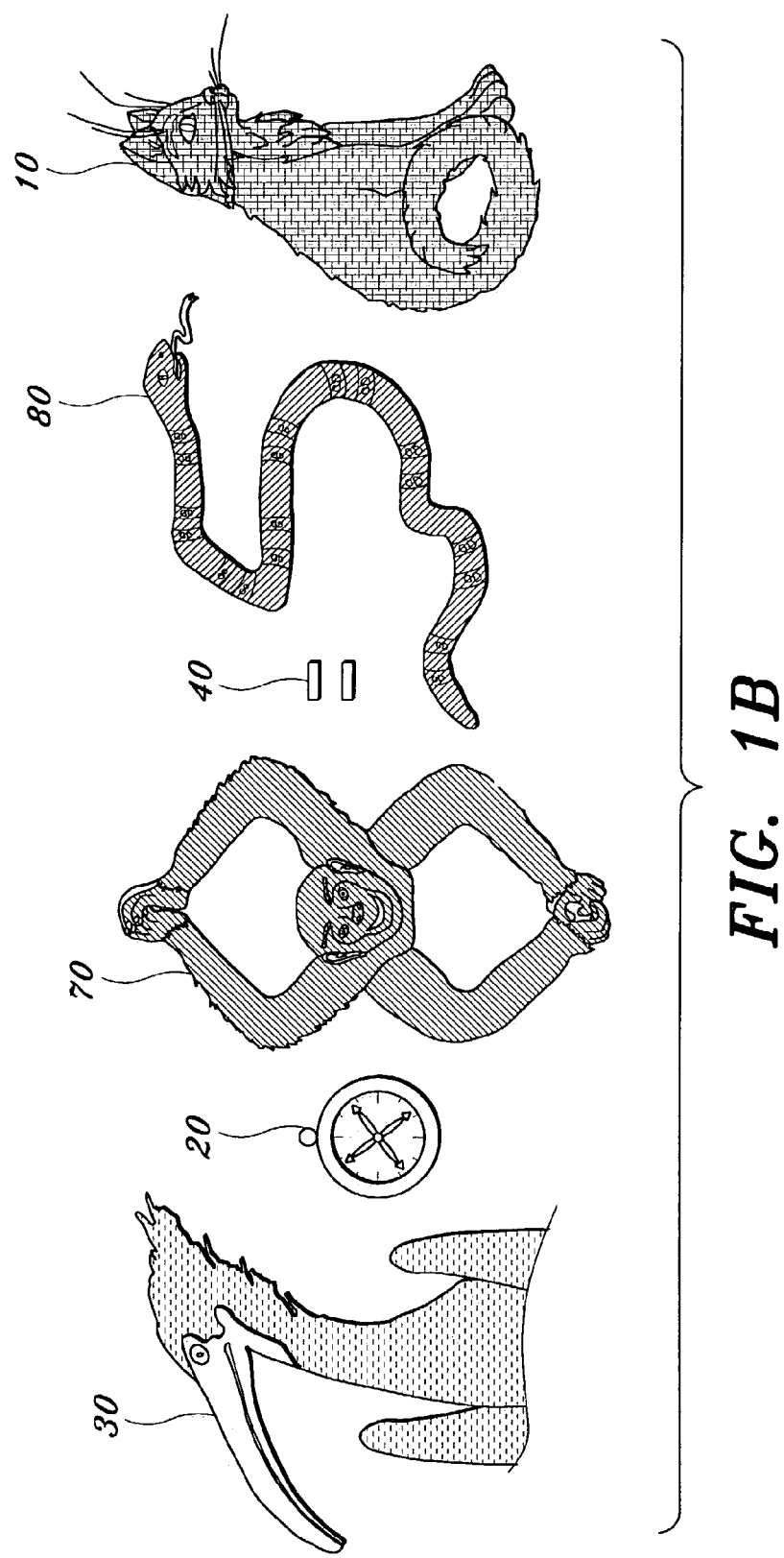
FIG. 1B is a schematic view of another math teaching aid according to the present invention in which an arithmetic calculation or equation is represented visually by pictures in place of numerals.

FIG. 1B shows another simple arithmetic calculation in which pictures of familiar objects have been substituted for numbers. A picture of a blue heron 30, which represents the numeral seven, is followed by a graphical depiction of the "×" symbol for multiplication 20. The "×" symbol is followed by a picture of a brown monkey 70, which represents the numeral eight. The monkey is followed by a graphical depiction of the "=" symbol for equals 40. The "=" symbol is followed by a picture of a green snake 80, which represents the numeral five. The snake is followed by a picture of a yellow cat 10, which represents the numeral six. Together, the snake and the cat represent the number fifty-six, which is the result of multiplying seven times eight. Again, only the illustrations are shown before reference is made to numbers.

In the second step of the method, students are familiarized with the visual or pictorial representation of each Arabic numeral, by itself. Again, no reference is made to the numeral itself. At this stage of the method, the goal is to condition the student to think of each plant or animal as a different entity, and to condition the student to associate each entity with a particular shape (which represents an Arabic numeral corresponding to the plant or animal) and a particular color. Exemplary representations of each Arabic numeral are shown in FIGS. 2A through 2E. It will be understood that FIGS. 2A through 2E are shown for purposes of exemplifying and enabling the method, and not for purposes of limitation, so that the assignment of particular plants or animals, or particular colors, to the individual numerals may vary from that shown in the Figures, provided that a particular plant or animal arranged in a particular shape and having a particular color is used consistently throughout application of the method.

Figure 2A:
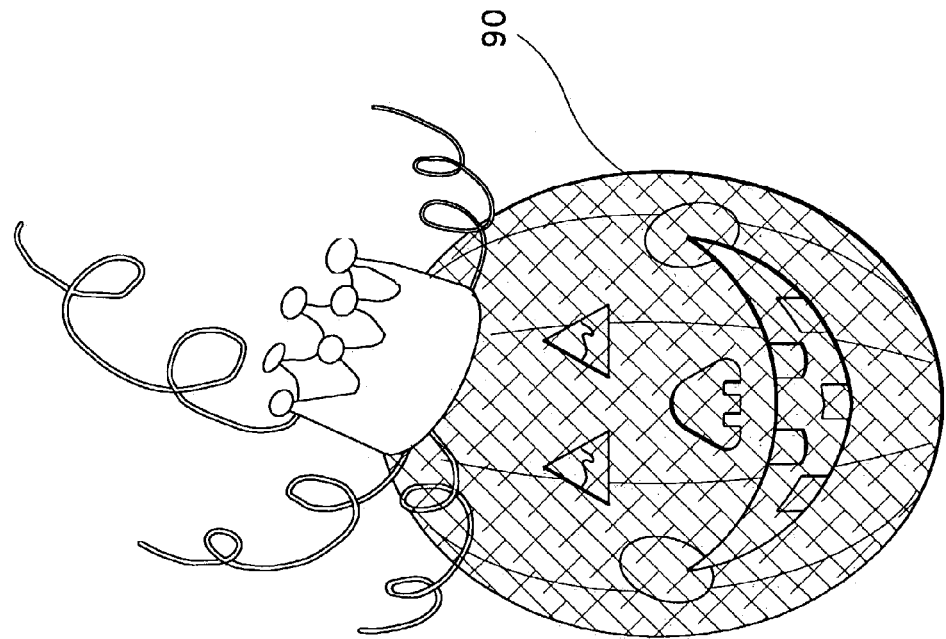
FIG. 2A is a schematic view of a math teaching aid according to the present invention depicting a pumpkin, which represents the numeral 0, and a fox, which represents the numeral 1.
Figure 2A:
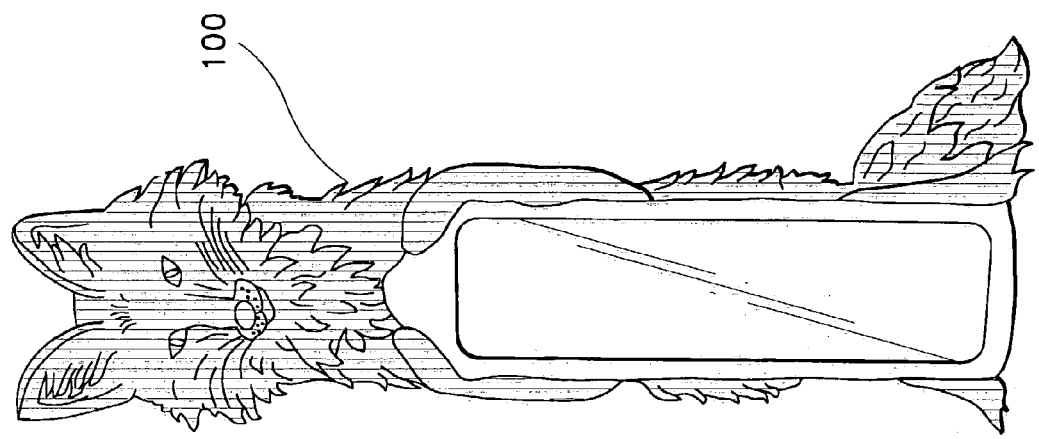

FIG. 2A shows a picture of an orange pumpkin 90, which stands for the Arabic numeral zero, and a picture of a red fox 100, which stands for the Arabic numeral one.

Figure 2B:
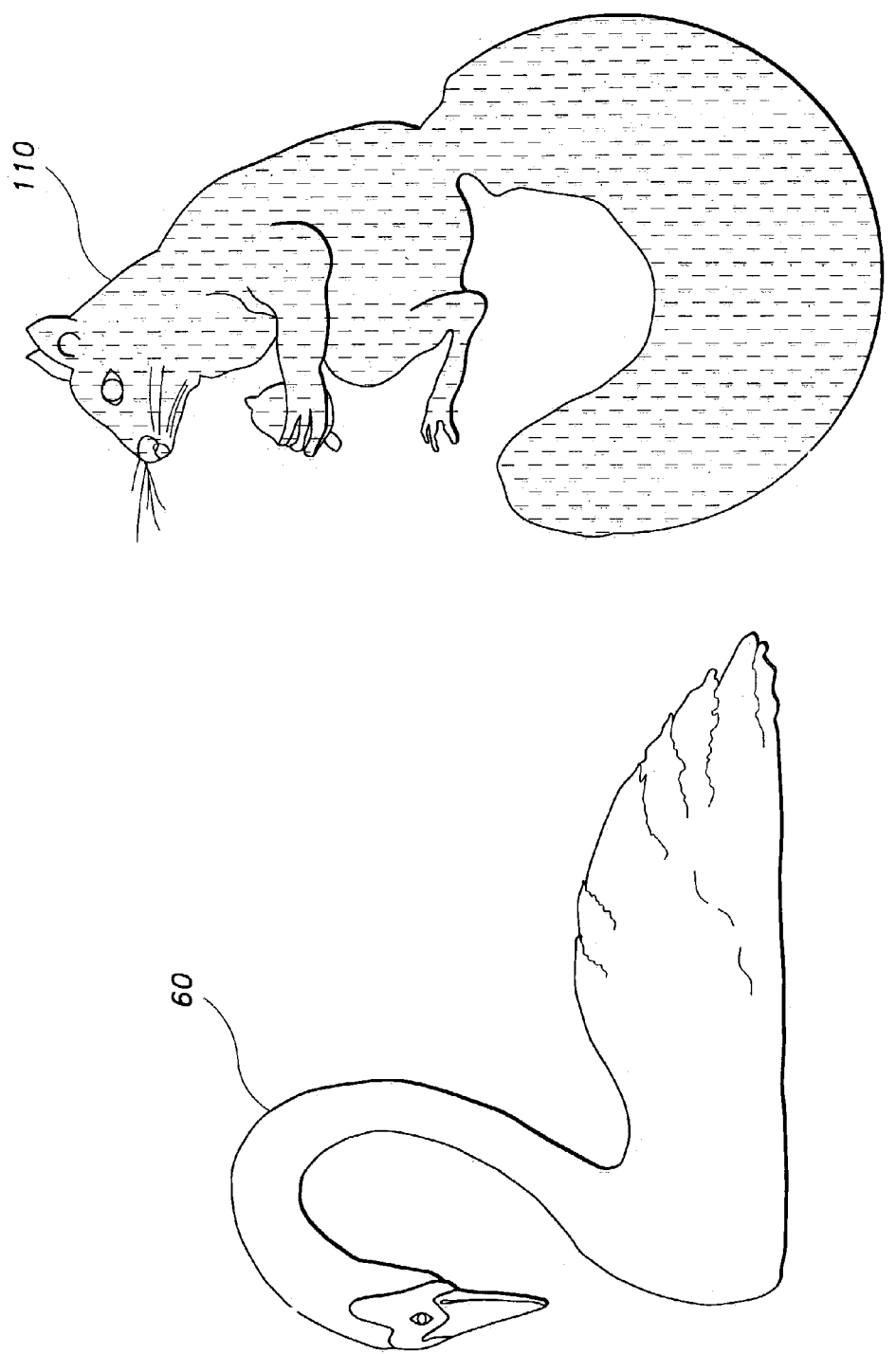
FIG. 2B, is a schematic view of a math teaching aid according to the present invention depicting a swan, which represents the numeral 2, and a squirrel, which represents the numeral 3.

FIG. 2B shows a picture of a white swan 60, which stands for the numeral two, and a picture of a gray squirrel 110, which stands for the numeral three.

Figure 2C:
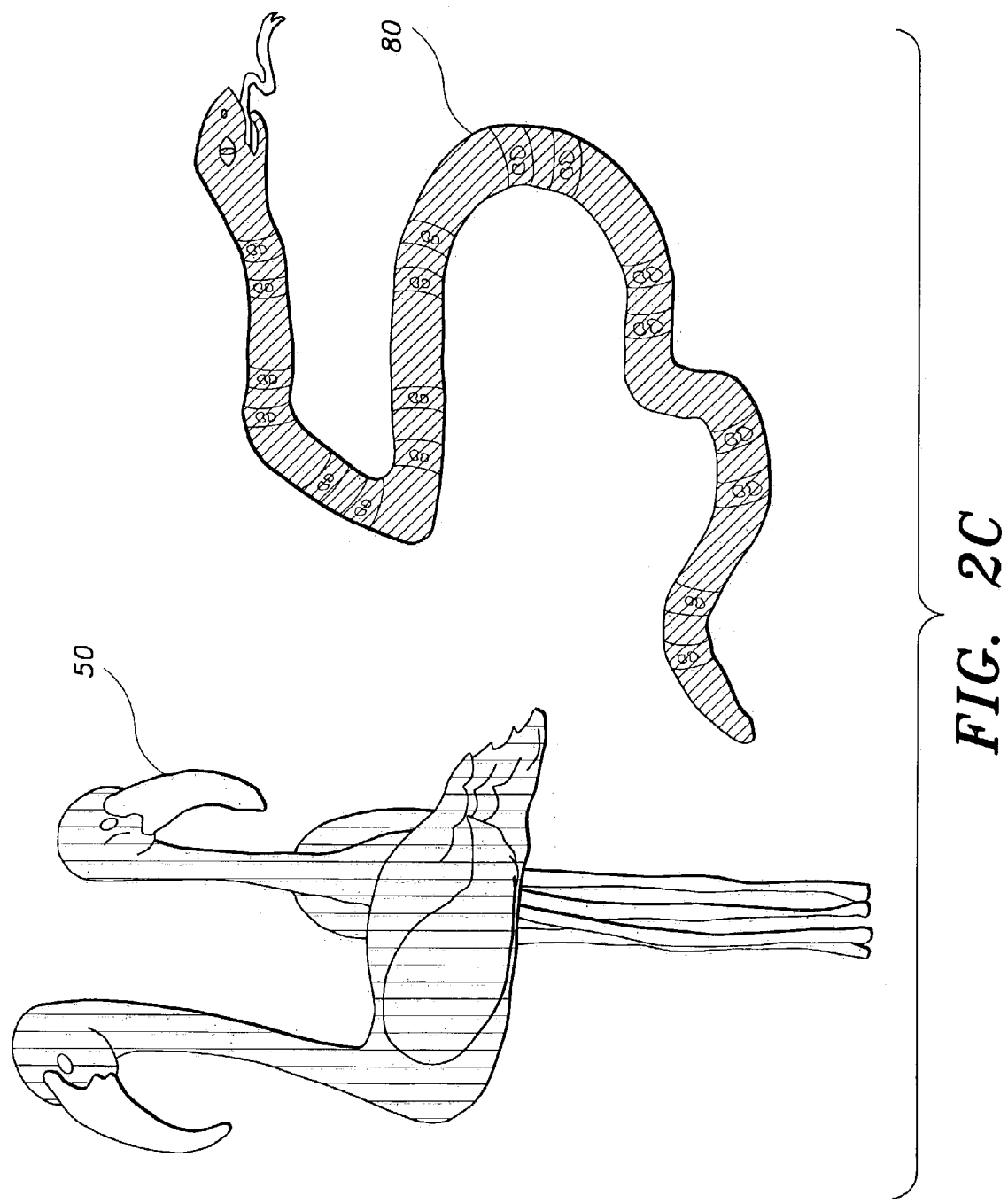
FIG. 2C is a schematic view of a math teaching aid according to the present invention depicting two flamingos, which represent the numeral 4, and a snake, which represents the numeral 5.

FIG. 2C shows a picture of two pink flamingos 50, which stand for the numeral four, and a picture of a green snake 80, which stands for the numeral five.

Figure 2D:
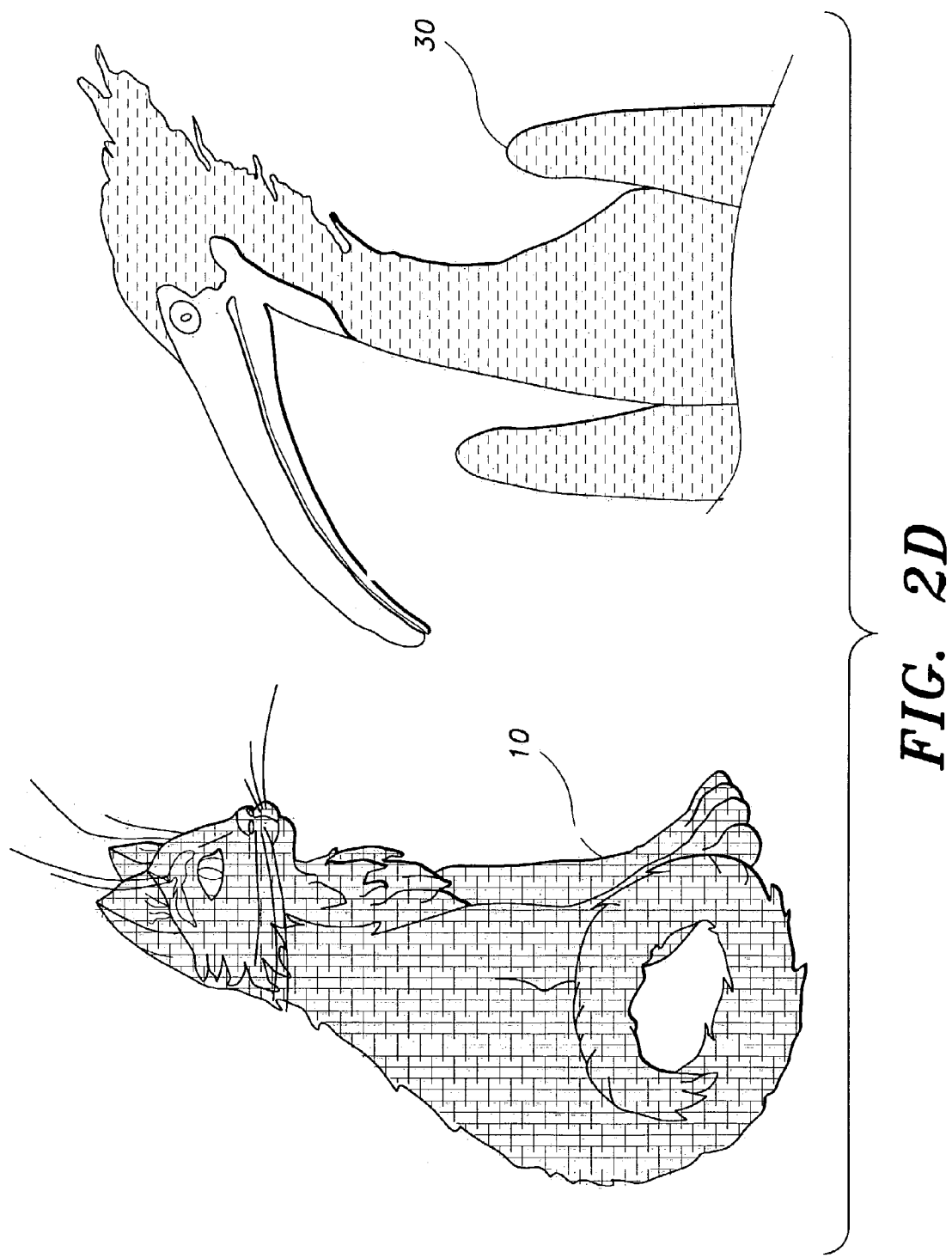
FIG. 2D is a schematic view of a math teaching aid according to the present invention depicting a cat, which represents the numeral 6, and a heron, which represents the numeral 7.

FIG. 2D shows a picture of a yellow cat 10, which stands for the numeral six, and a picture of a blue heron 30, which stands for the numeral seven.

FIG. 2E shows a picture of a brown monkey 70, which stands for the numeral eight, and a picture of a tan or light brown bighorn sheep 120, which stands for the numeral nine.

In the third step of the present method, students are again shown each object, by itself. In this step, however, the object is shown, then the numeral represented by the object is overlaid on top of the object, as shown in FIGS. 3A to 3E. No matter what artistic medium the objects and the numerals appear in, portions of an object may be seen around a numeral. In this way, the association between each object and its corresponding numeral is made clear to students.

Figure 3A:
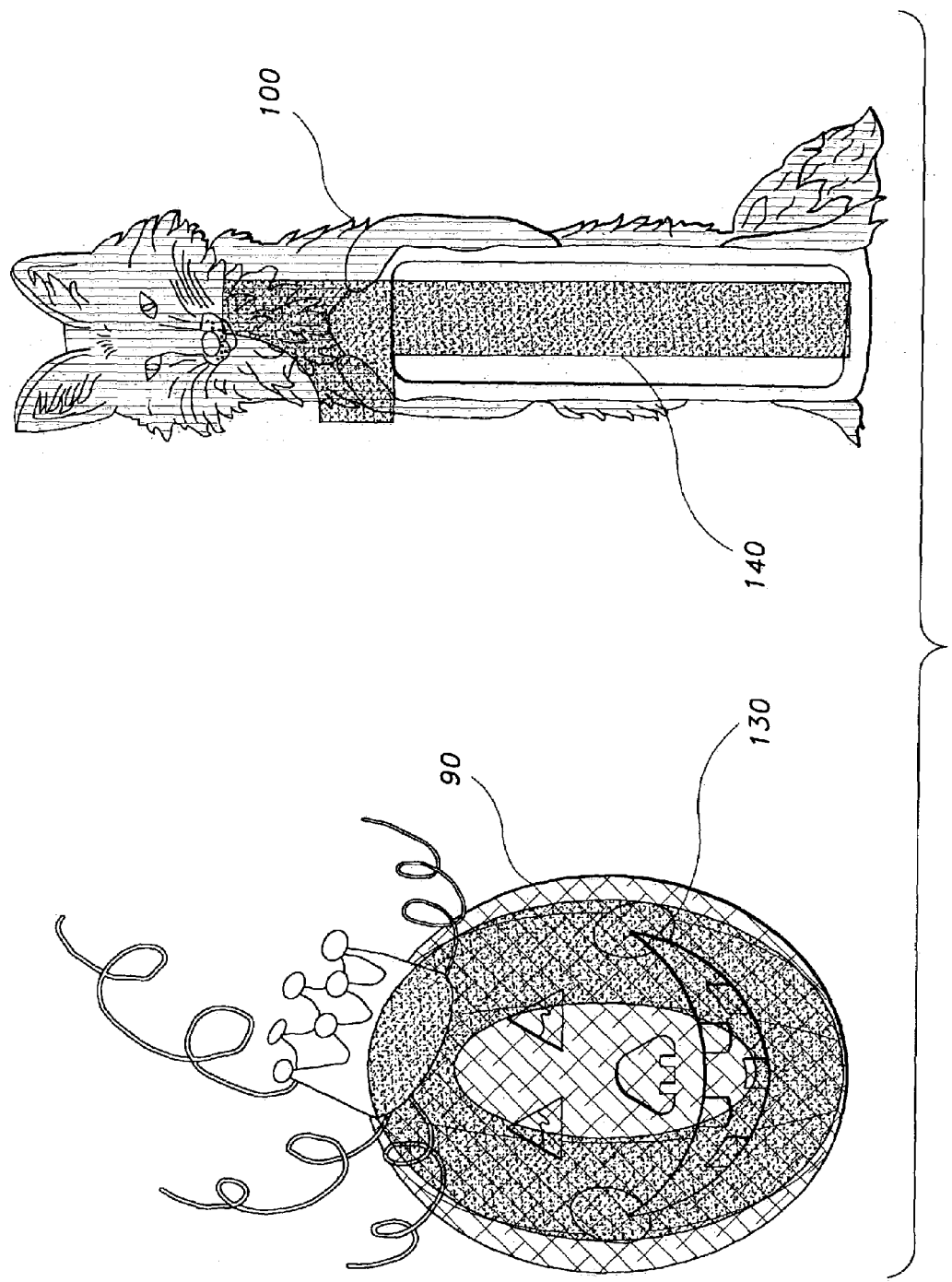
FIG. 3A is a schematic view of a math teaching aid according to the present invention depicting the pumpkin of FIG. 2A, with the numeral 0 overlaid on top of the pumpkin, and the fox of FIG. 2A, with the numeral 1 overlaid on top of the fox.

FIG. 3A shows an image of an orange pumpkin 90, overlaid by the Arabic numeral zero 130, and an image of a red fox 100, overlaid by the Arabic numeral one 140.

Figure 3B:
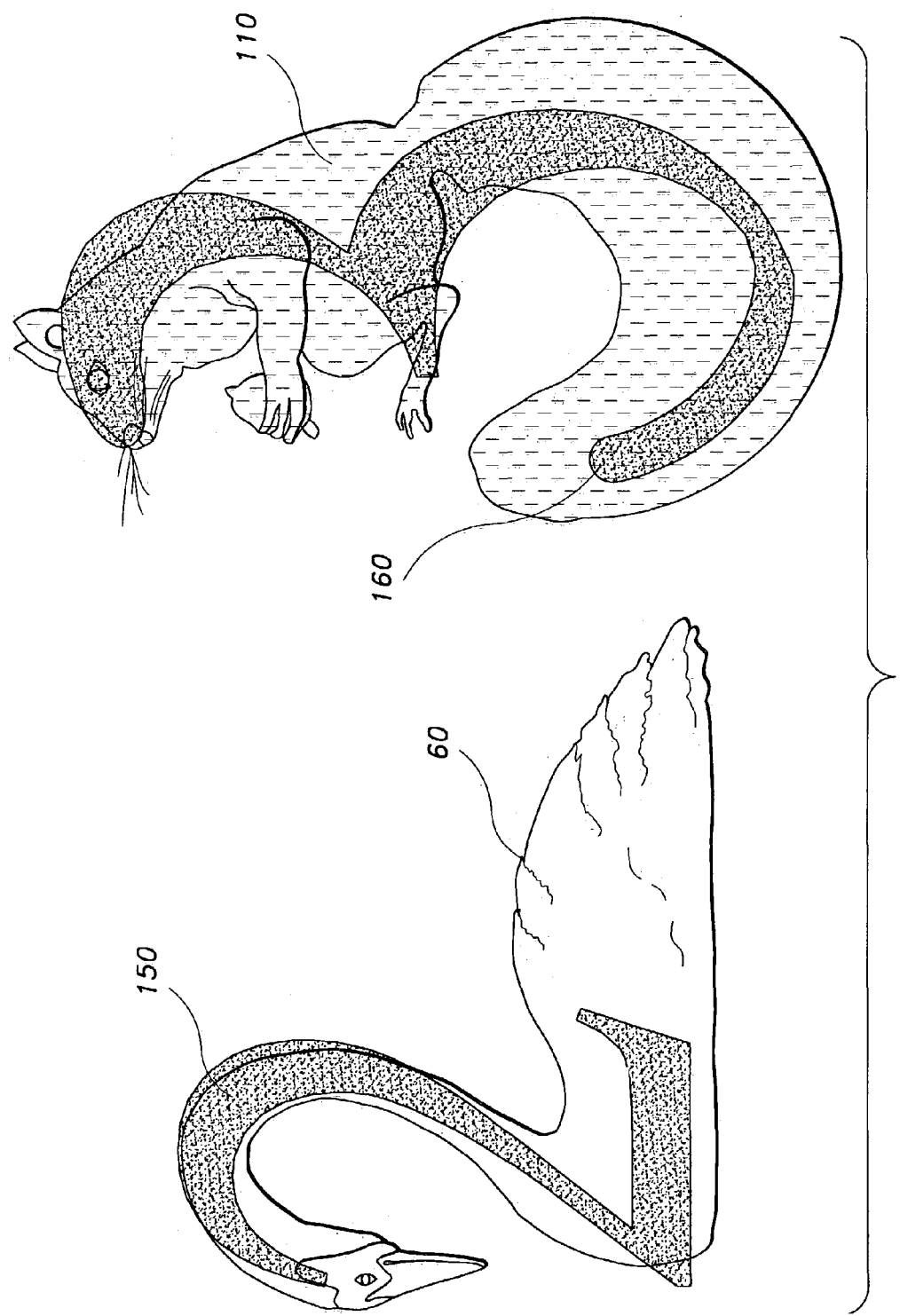
FIG. 3B is a schematic view of a math teaching aid according to the present invention depicting the swan of FIG. 2B, with the numeral 2 overlaid on top of the swan, and the squirrel of FIG. 2B, with the numeral 3 overlaid on top of the squirrel.

FIG. 3B shows an image of a white swan 60, overlaid by the Arabic numeral two 150, and an image of a gray squirrel 110, overlaid by the Arabic numeral three 160.

Figure 3C:
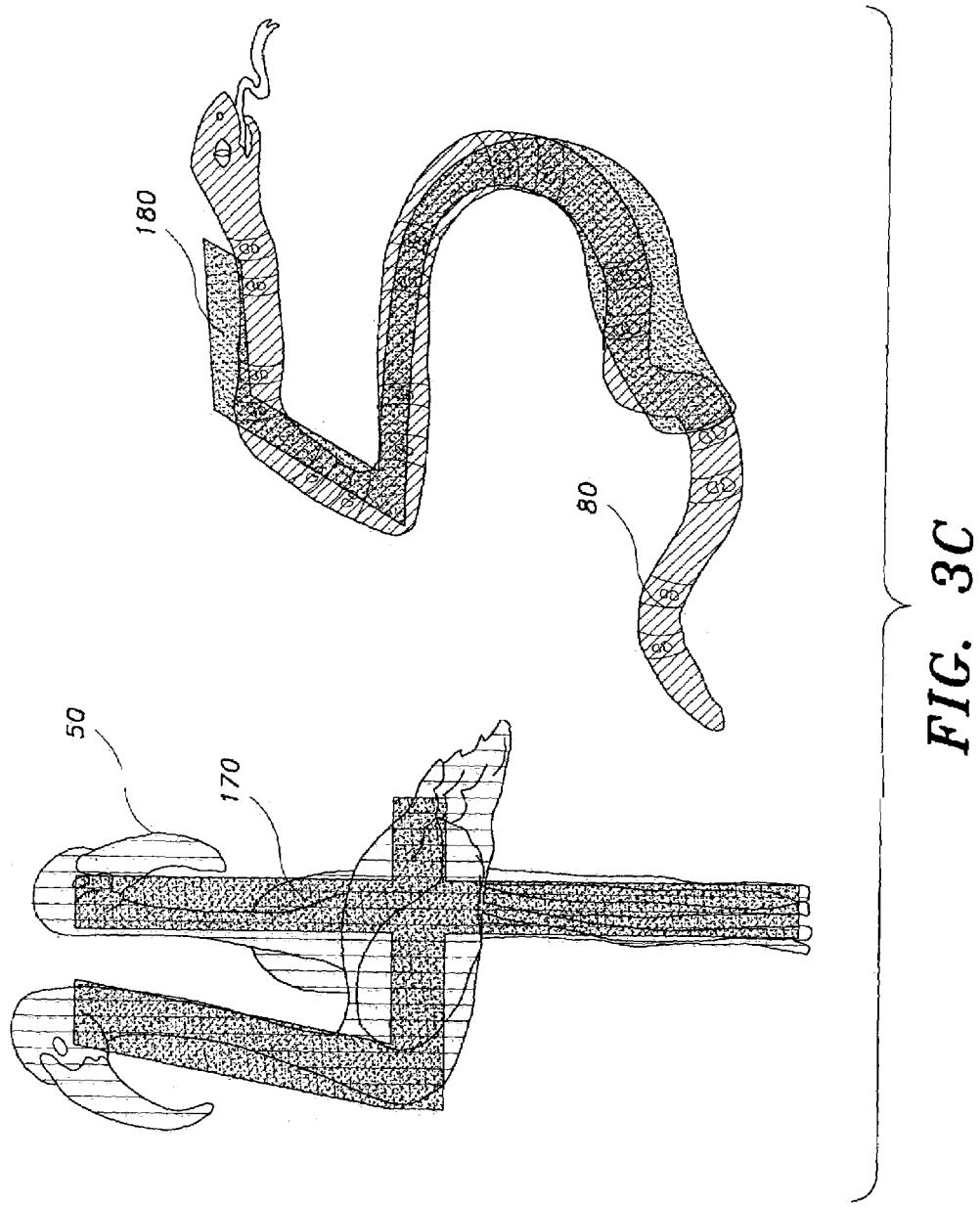
FIG. 3C is a schematic view of a math teaching aid according to the present invention depicting the flamingos of FIG. 2C, with the numeral 4 overlaid on top of the flamingos, and the snake of FIG. 2C, with the numeral 5 overlaid on top of the snake.

FIG. 3C shows an image of two pink flamingos 50, overlaid by the Arabic numeral four 170, and an image of a green snake 80, overlaid by the Arabic numeral five 180.

Figure 3D:
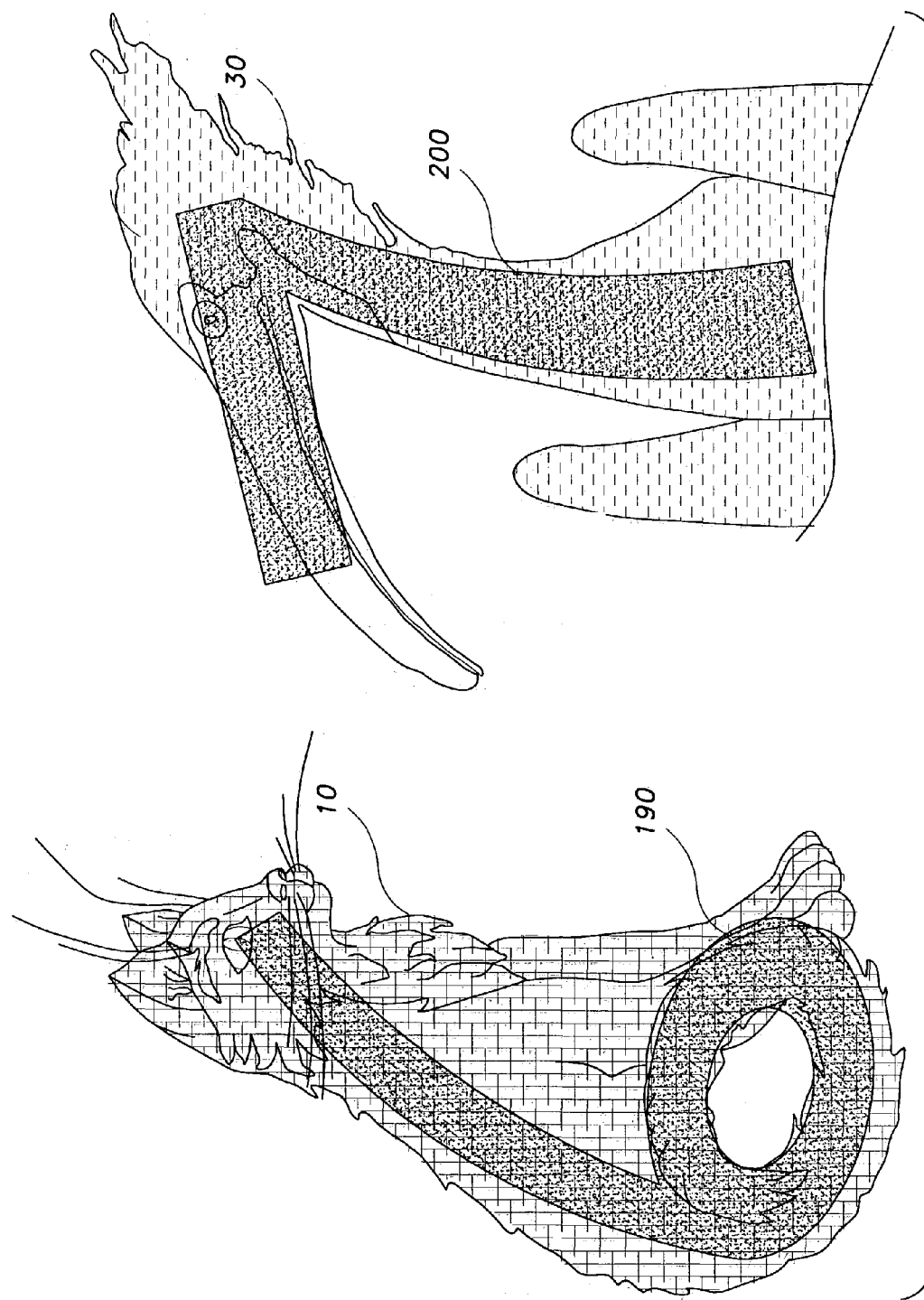
FIG. 3D is a schematic view of a math teaching aid according to the present invention depicting the cat of FIG. 2D, with the numeral 6 overlaid on top of the cat, and the heron of FIG. 2D, with the numeral 7 overlaid on top of the heron.

FIG. 3D shows an image of a yellow cat 10, overlaid by the Arabic numeral six 190, and an image of a blue heron 30, overlaid by the Arabic numeral seven 200.

Figure 3E:
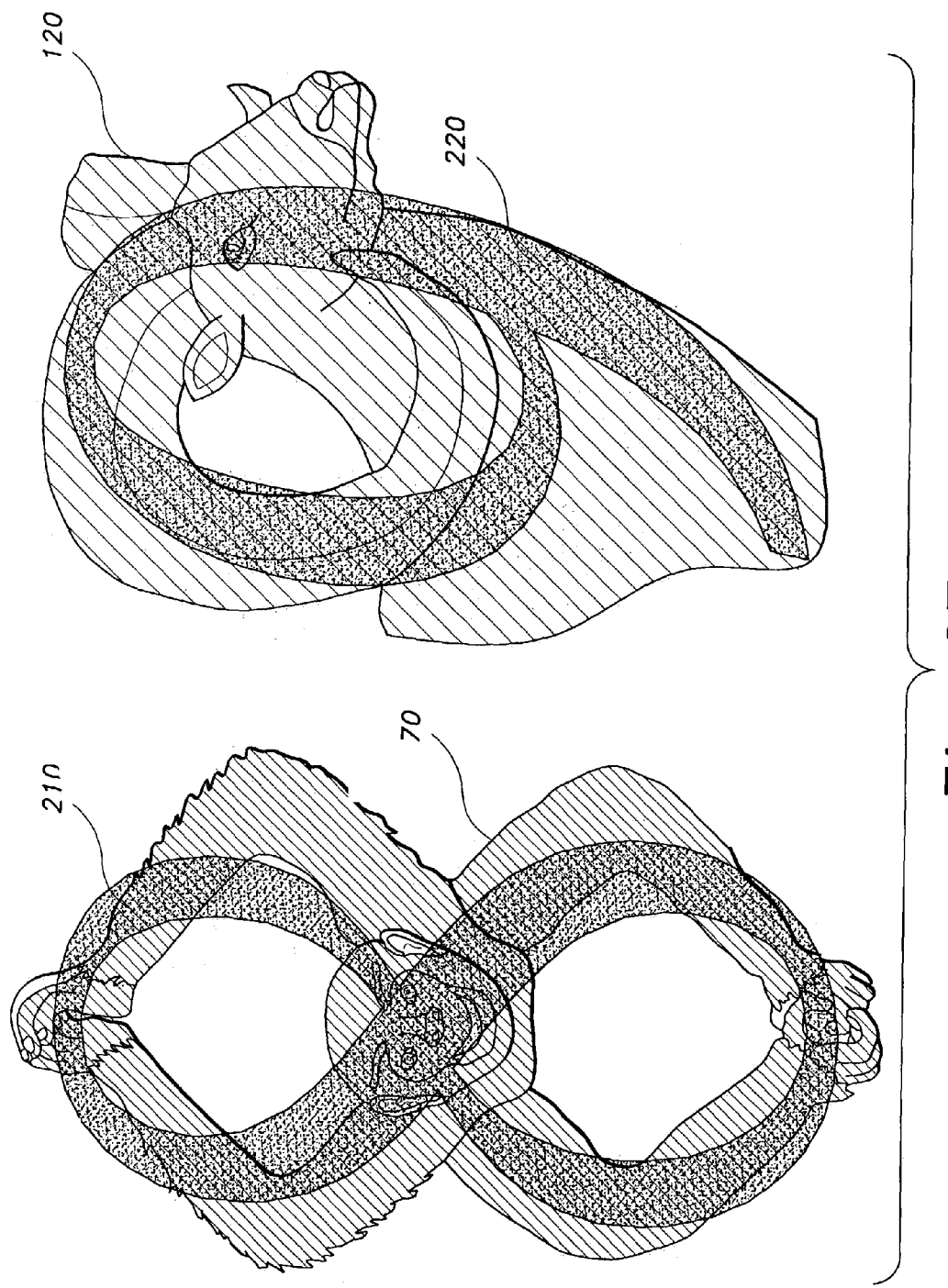
FIG. 3E is a schematic view of a math teaching aid according to the present invention depicting the monkey of FIG. 2E, with the numeral 8 overlaid on top of the monkey, and the bighorn sheep of FIG. 2E, with the numeral 9 overlaid on top of bighorn sheep.

FIG. 3E shows an image of a brown monkey 70, overlaid by the Arabic numeral eight 210, and an image of a tan or light brown bighorn sheep 120, overlaid by the Arabic numeral nine 220.

In the fourth step of the instant method, examples of simple arithmetic calculations, such as those referred to in FIG. 1A and FIG. 1B, are again presented to students, but this time, the numerals associated with the objects are overlaid on top of the objects in the equations. The steps of this teaching method may need to be adjusted according to each individual student or group according to their learning needs.

In the fifth step of the instant method, the relationship between the pictures of familiar objects and their corresponding numbers is reinforced with an additional, visual demonstration. Each illustration of a common object is matched with an image of colored dots. The number of dots corresponds to the numerical value represented by the object. In addition, the color of the dots matches the color of their corresponding objects. This matching of the object with the dots may take the form of flash cards, with the pictorial representations on one side and the dot images on the reverse side. When computer images are used, the matching may be performed by clicking on an icon to toggle between the pictorial image and the dot image, or in an electronic display by highlighting an image and pressing a toggle button. On videotape, the matching may be done by editing successive images, or by split screen. etc. Or colored balls may be used.

Figure 4A:
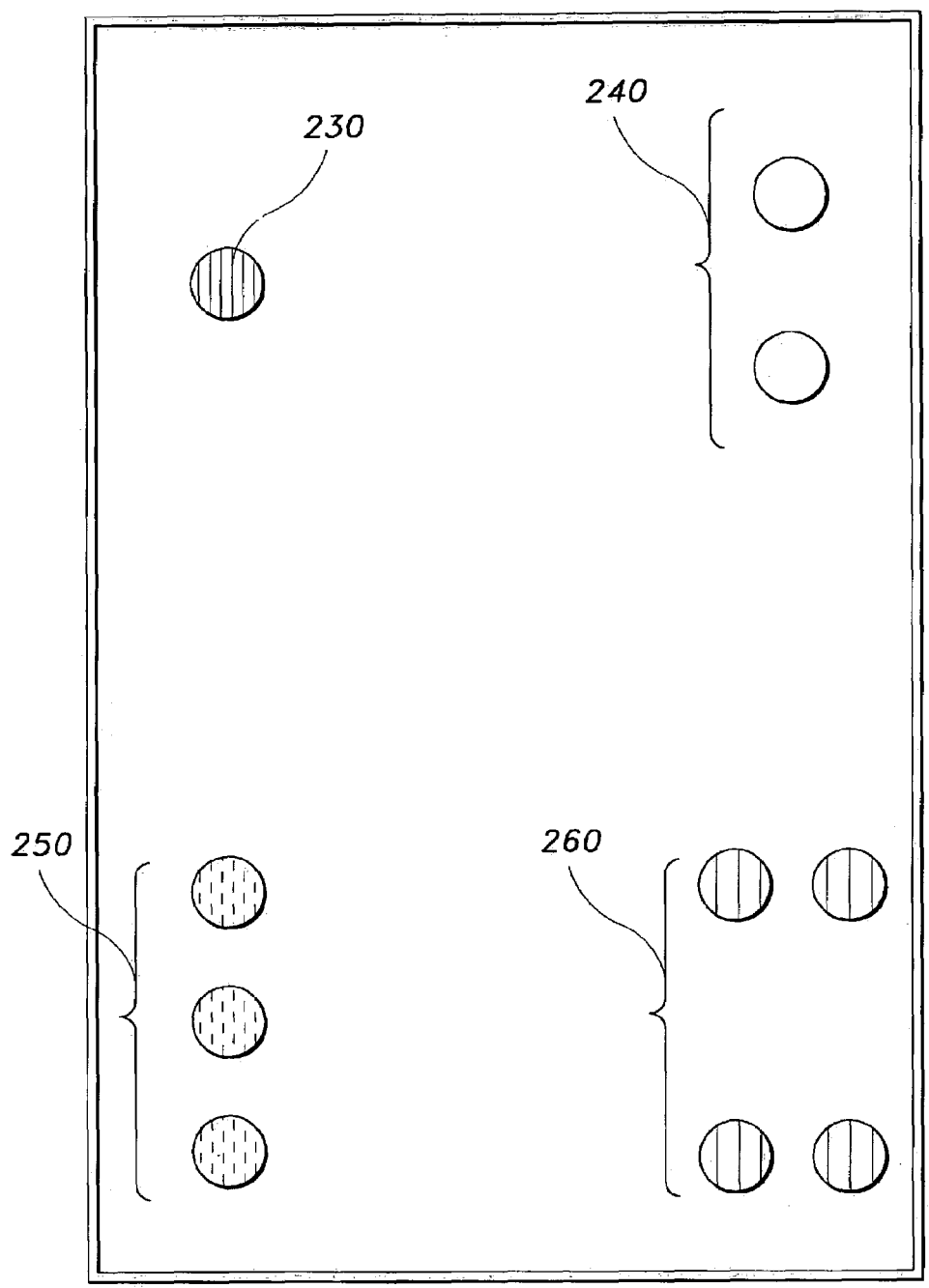
FIG. 4A is a schematic view of a math teaching aid according to the, present invention depicting four groups of dots, which represent the numbers one, two, three, and four.

FIG. 4A shows four groups of such dots. The number one is represented by one red dot 230. The number two is represented by two white dots 240. The number three is represented by three purple or violet dots 250. The number four is represented by four pink dots 260. Note that black-and-white shading patterns have been used to denote color. Also note that the shading patterns on the dots match the shading patterns on their corresponding objects. For example, the shading pattern on the group of three dots 250 in FIG. 4A matches the shading pattern on the squirrel 110 in FIG. 2B, which represents the number three. The shading pattern on the group of four dots 260 in FIG. 4A matches the shading pattern on the flamingos 50 in FIG. 2C, which represents the number four, etc.

Figure 4B:
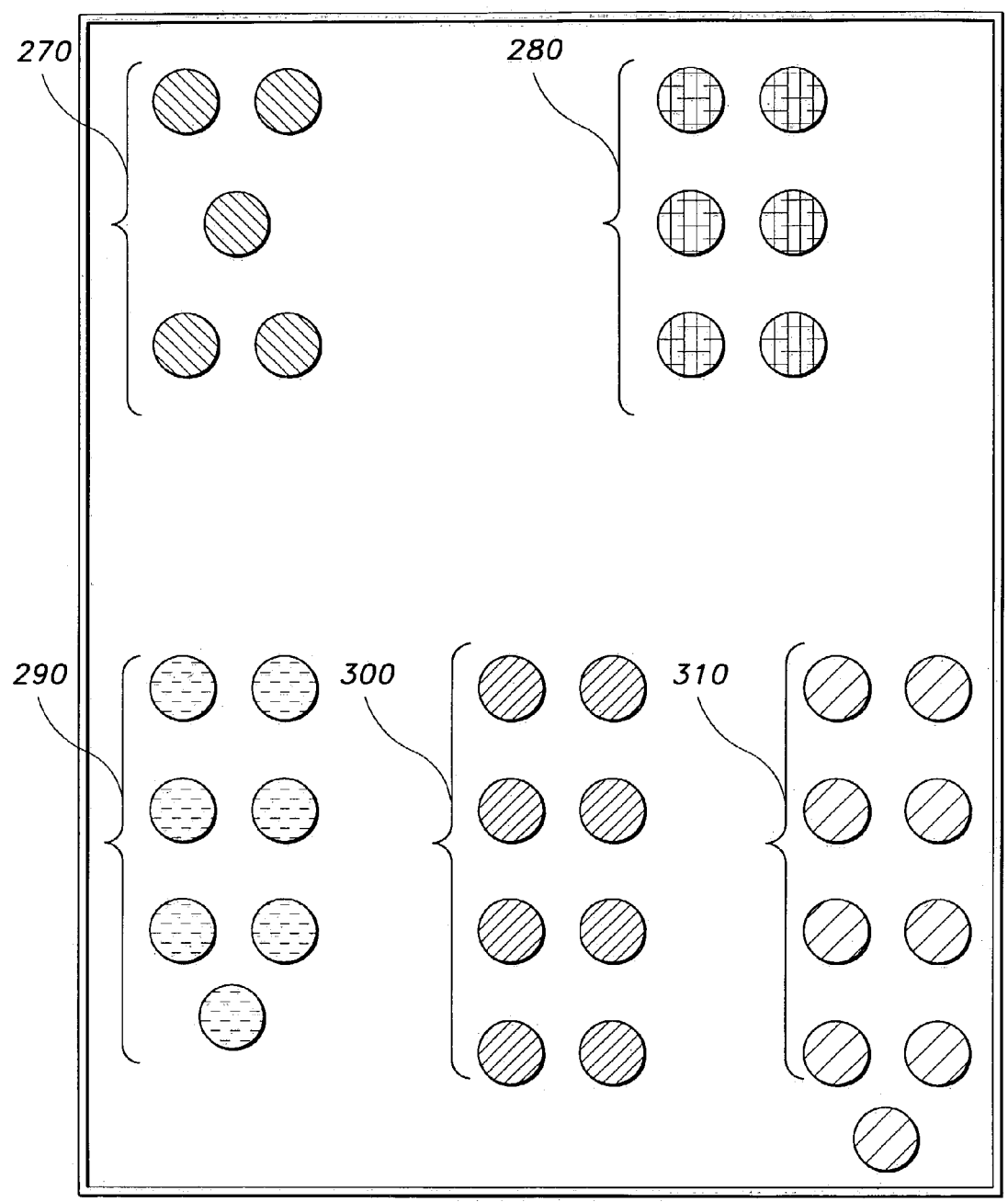
FIG. 4B is a schematic view of a math teaching aid according to the present invention depicting five groups of dots, which represent the numbers five, six, seven, eight, and nine.

FIG. 4B shows additional groups of dots. The number five is represented by five green dots 270. The number six is represented by six yellow dots 280. The number seven is represented by seven blue dots 290. The number eight is represented by eight brown dots 300. The number nine is represented by nine tan or light brown dots 310.

Color association aids in the learning process. Since the students already know how to count, association of the four pink dots 260, e.g., with the pink flamingos 50, and thence with the overlaid Arabic numeral four 170, and thence to the numeral four in the product forty-two in FIG. 1A, serves to interconnect the calculation with the images, and with the concept of numbers learned through counting. Although FIGS. 1A and 1B show multiplication examples, it will be understood that similar depictions may be used with division, addition, subtraction, and other arithmetical operations. In this manner, the system of visual images, presented in the order indicated, may be used to teach mathematics and arithmetic operations to students who find it difficult to reason abstractly or to memorize multiplication tables in conventional formats.

It is to be understood that the present invention is not limited to the sole embodiment described above, but encompasses any and all embodiments within the scope of the following claims.

I claim:

1. A visual method of teaching elementary mathematics, comprising the steps of:
    displaying to students examples of elementary arithmetic calculations, wherein graphical representations of common objects having a shape generally of an Arabic numeral are substituted for a corresponding number;
    displaying to students said graphical representations of common objects, one by one, wherein the shapes of the objects resemble the shapes of the Arabic numerals 0, 1, 2, 3, 4, 5, 6, 7, 8, and 9, and wherein each object is a different color;
    displaying to students the corresponding Arabic numerals overlaid on top of said graphical representations of common objects, wherein the overlaid numeral matches the numerical value suggested by the shape of the graphical representation of each object, and wherein portions of the object remain visible around the numeral;
    displaying again to students said examples of elementary arithmetic calculations, with the corresponding Arabic numerals overlaid on top of said graphical representations of common objects; and
    displaying to students graphical representations of groups of colored dots or balls, wherein the color of each group of dots matches the color of one of said graphical representations of common objects, and wherein each said group has a number of dots or balls which matches the number of its corresponding object.

2. The method of claim 1, wherein said graphical representations of common objects representing numbers are displayed in a medium selected from the group consisting of print, computer graphics, electronic display, videotape, optical, and any medium used for sculpture.

3. The method of claim 1, wherein said graphical representations of common objects representing numbers are graphical representations of plants.

4. The method of claim 1, wherein said graphical representations of common objects representing numbers are graphical representations of animals.

5. The method of claim 1, wherein the step of displaying to students graphical representations of groups of colored dots or balls further comprises displaying to the students a plurality of flash cards, said graphical representation of a common object being displayed on a first side of said card and said group of dots or balls being displayed on a second side of said card.

6. The method of claim 1, wherein the step of displaying to students graphical representations of groups of colored dots or balls further comprises:
    displaying to the students computer images;
    toggling between the graphical image of said common objects and the graphical image of said dots.

7. The method of claim 1, wherein mathematical operators in said elementary arithmetic equations, including "+", "−", "×", "÷" and "=", are depicted in their traditional appearance.

8. The method of claim 1, wherein mathematical operators in said elementary arithmetic equations, including "+", "−", "×", "÷" and "=", are depicted in a graphical form.

* * * * *